United States Patent Office 3,013,753
Patented Dec. 19, 1961

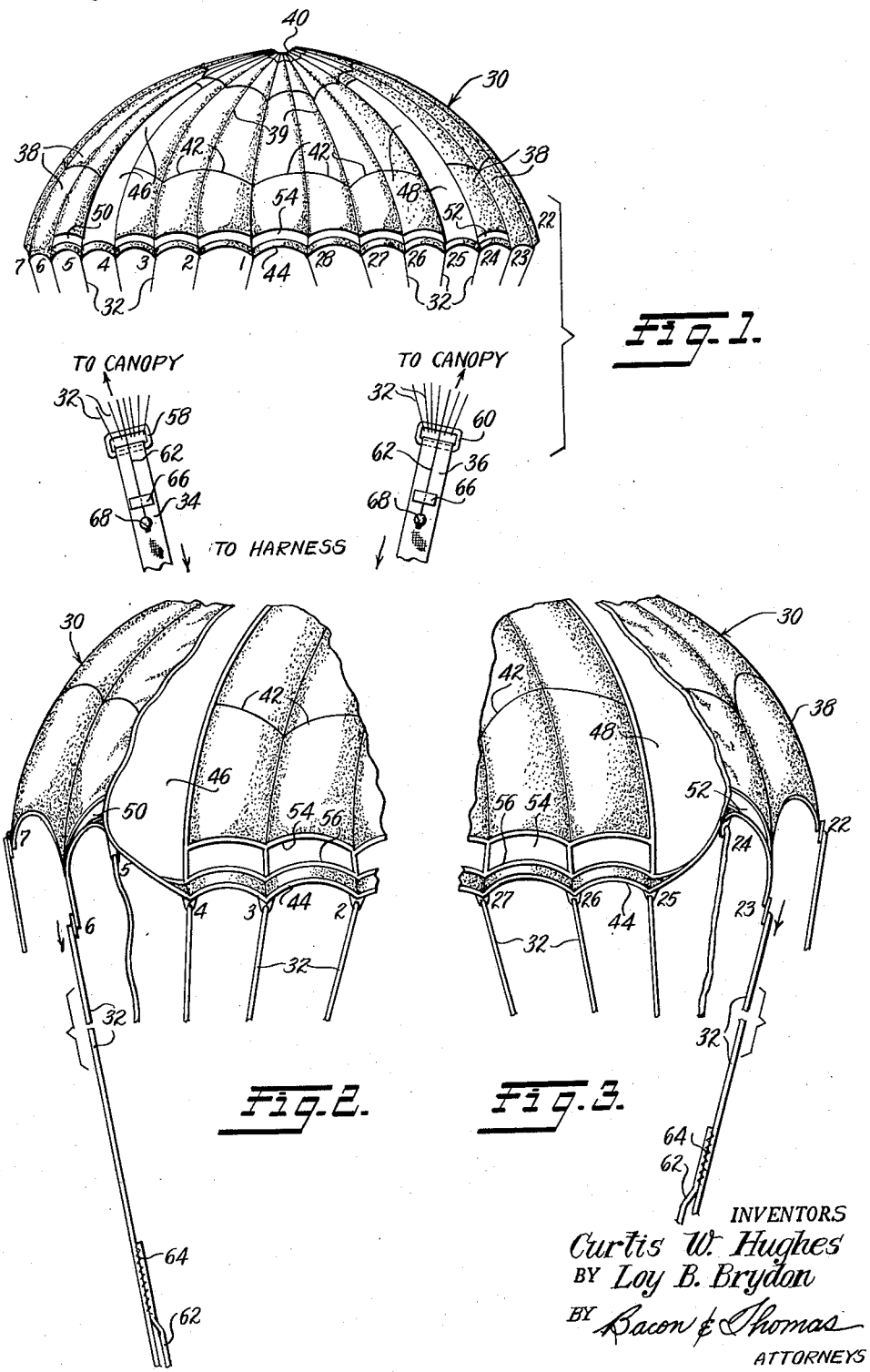

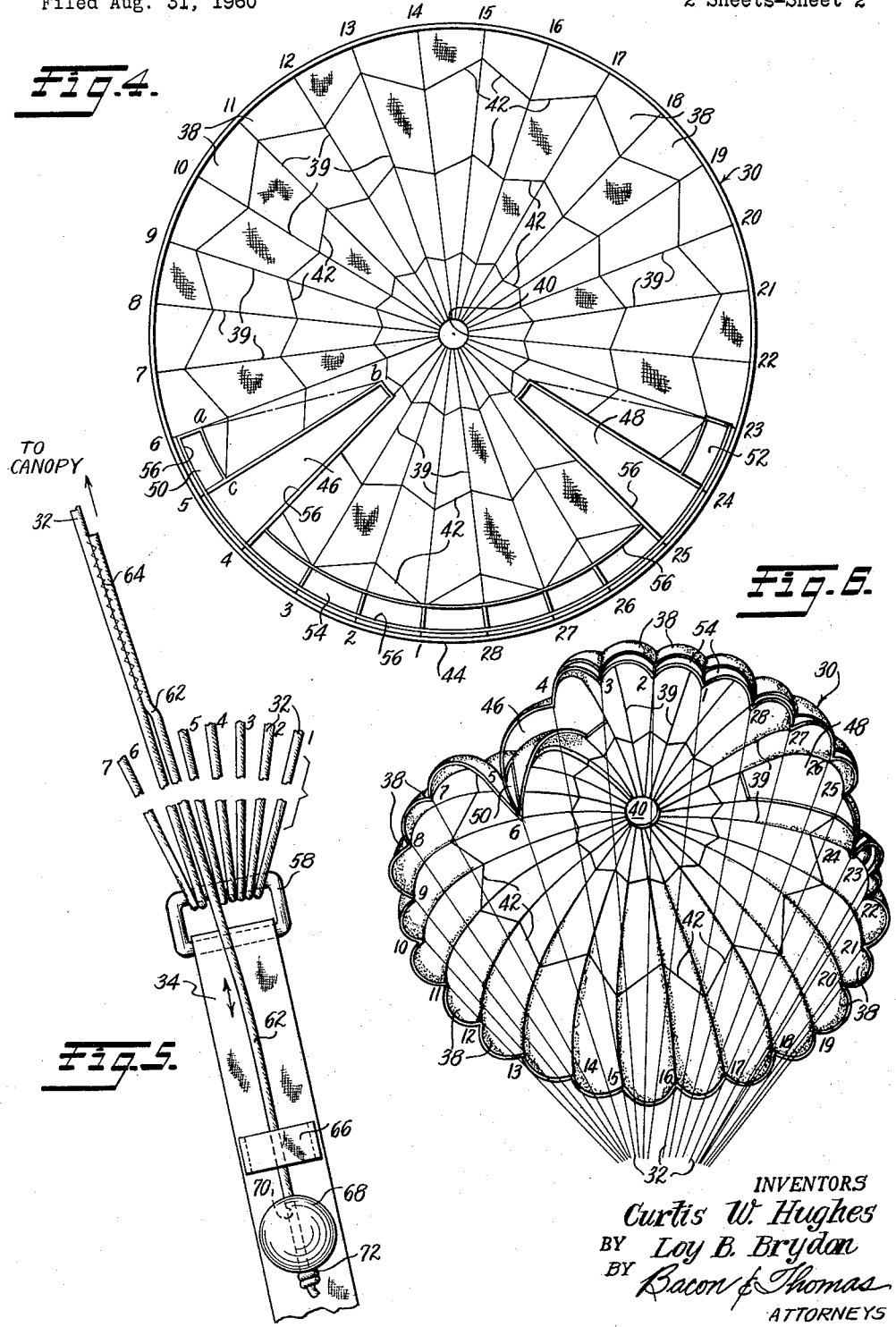

3,013,753
STEERABLE PARACHUTE
Curtis W. Hughes and Loy B. Brydon, Fayetteville, N.C., assignors to Capital Parachuting Enterprises, Fayetteville, N.C., a sole proprietorship
Filed Aug. 31, 1960, Ser. No. 53,127
14 Claims. (Cl. 244—145)

This invention relates to a novel parachute, and more specifically to a parachute capable of being controlled while falling.

A person falling with a parachute is carried along by prevailing air currents, having very little control over the general direction. Some measure of control can be exercised by selective pulling on certain suspension lines to modify the spill of air from the canopy, but, in a conventional canopy, such control is of small degree, and the parachutist is left more or less at the mercy of prevailing air currents, sometimes landing in trees or small bodies of water, or even atop buildings.

It is an object of the invention to provide a parachute having a novel canopy capable of being controlled to effect a forward or a reverse movement during falling, or to effect a drop without forward or reverse movement, even in moving air currents.

A further object is to provide a parachute having a novel canopy capable of producing a controlled rotation or spin in a clockwise or counterclockwise direction at the will of the parachutist.

A still further object is to provide a novel steering apparatus for a parachute, positioned within convenient reach of the parachutist, which can be operated to control the steering of the parachute.

A still further object is to provide a novel control arrangement by which a conventional parachute can be readily modified to acquire a high degree of maneuverability.

The above and other objects and advantages will become apparent from a consideration of the following specification in conjunction with the annexed drawings, in which:

FIG. 1 is an elevational view of the invention showing the canopy in blossom and a pair of risers;

FIG. 2 is a fragmentary view of the left rear quarter section of the canopy illustrating the relative positions of some controlling surfaces when one controlling member is operated;

FIG. 3 is a fragmentary view, showing the relative positions of the controlling surfaces in the right rear quarter section of the canopy when another controlling member is operated;

FIG. 4 is a plan view of the canopy;

FIG. 5 is a fragmentary view showing a control member and its relation to the harness and suspension lines; and FIG. 6 is a bottom perspective view of the canopy in blossom with the parts in a left turn attitude.

In the description which follows, the term "steering" is used in a broad sense synonymously with "maneuvering," to apply to changes of movement forwardly and rearwardly relative to the direction which the parachutist may be facing, as well as to orientation of the direction the parachutist may be facing.

Referring to the several figures of the drawings in which similar elements are designated by the same reference numeral, there is shown a parachute comprising a canopy 30, a series of suspension lines 32, and a harness including four risers, only two of which risers, designated 34 and 36, being shown.

The canopy 30 is made up of a series of gores 38, which may be constructed of 1.1 oz. ripstop nylon or the like, the gores being stitched with a series of radial seams 39 in the umbrella-like structure shown. The central portion of the canopy is provided with a spill opening 40, and a plurality of bias seams 42 are arranged in zigzag fashion about the canopy, as more clearly shown in FIG. 4. The outer edge of the canopy is reinforced with a peripheral tape 44.

With reference to FIG. 4, showing a plan view of the open canopy 30 with the front or forward edge facing the upper end of the sheet, it should be noted that there are twenty-eight gores 38, and that the suspension lines 32 (FIG. 1) are continuous and pass through the radial length of the seamed edges 39, being reinforced by a concentric tape at the periphery of the apex vent or spill opening 40. Beginning with the numeral 1, shown to the left of a vertical line passing through the center, there are twenty-eight suspension points extending between adjacent gores. For convenience in designation, the area connected to the points numbered 1 to 7 is usually referred to as the left rear quarter section; the area connected to the points 8 to 14 is termed the front left quarter section; the area connected to the points 15 to 21 is termed the right front quarter section; and the area connected to the points 22 to 28 is termed the right rear quarter section. The suspension lines 32 in each of these quarter sections are secured to one of the risers of the harness. FIG. 1 shows the seven suspension lines of the left rear quarter section connected to the riser 34, and the seven suspension lines of the right rear quarter section are connected to the riser 36. In similar manner, the seven lines of the right front quarter section and the seven lines of the left front quarter sections are connected to the respective risers, not shown.

The above described structure is conventional, and some degree of maneuverability may be obtained by applying a pull to selected ones of the suspension lines 32, which is effective to modify the spill characteristics of the canopy and thereby modify the direction of fall. Such operation, at best, affords a very limited degree of control, and requires considerable experience to get even these results.

To provide greater and easier maneuverability, the invention contemplates the provision of a pair of elongated slots 46 and 48 in a pair of spaced gores 38. These slots may be provided in any spaced pair of gores, but in the preferred embodiment are made in corresponding gores in the left rear quarter section and the right rear quarter section, specifically between the suspension points 4 and 5, and suspension points 24 and 25. These slots extend over the major radial length of the gores, and the entire width of the gore, beginning at a point adjacent the periphery of the canopy. As an example, the outer end of each slot may be spaced about three inches from the outer periphery, and the inner end of the slot may be located about forty-eight inches from the spill opening 40. Adjacent the outer end of the elongated slot 46, and extending laterally therefrom in a clockwise direction, as viewed in FIG. 4, is a laterally extending slot 50, which extends the entire width of the adjacent gore 38. This slot may, for example, be twelve inches in radial extent. A similar laterally extending slot 52, extending in a counterclockwise direction from the outer end of the elongated slot 48, as viewed in FIG. 4, has the same dimensions. A circumferentially extending slot 54 is provided adjacent the outer ends of the gores 38 between the slots 46 and 48. As shown in FIG. 4, the circumferentially extending slot 54 passes through the outer ends of seven consecutive gores, but may extend through fewer or more gores. The edges of the slots 46, 48, 50, 52 and 54 are reinforced by a tape 56.

The above-described slotted structure provides controlling surfaces which, by proper manipulation of certain suspension lines 32, can be used to maneuver the parachute in its fall. Considering the structure as a whole, it is apparent that, during descent with the parachute canopy fully open, there will be a spill of air from the canopy through the slots 46, 48, 50, 52 and 54, thereby reducing the drag in the two quarter sections in which these openings are located. As described above, these openings are all located in the two rear quarter sections, and as a result of this spill and unbalancing of the drag, a forward horizontal component is created, which, under favorable conditions, can provide a horizontal speed of about 10 miles per hour.

The upper end of each riser carries a link, to which the suspension lines are connected. With reference to FIGS. 1 and 5, the seven suspension lines 32 from the left rear quarter section are attached to a connecting link 58, and the seven lines from the right rear quarter section are attached to a connecting link 60 of the riser 36. A pair of steering lines 62 are provided, one steering line being attached to the suspension line joining point 6, that is, along the seam between the outer end of the laterally extending slot 50 and the adjacent unslotted gore (see FIG. 2). Similarly (FIG. 3), the other steering line 62 is attached to the suspension line 32 connected to point 23, that is, to that suspension line which passes through the seam between the outer end of the laterally extending slot 52 and the adjoining unslotted gore 38. These steering lines, as more clearly shown in FIG. 5, may be stitched at 64 to certain suspension lines, the stitching extending for about three inches, and spaced about four feet from the point of attachment of the suspension line 32 with the connector link, to provide a slack in the suspension line between the stitching and the connector link when the steering line is pulled as described below. The other or free end of each steering line 62 passes under a retaining loop 66 stitched to the risers, and carries on the end thereof a grasping member 68 in the form of a ball, which may be made of wood or rubber. The member 68 has a diametrically extending aperture 70, through which the end of the steering line 62 passes, the end having a stop 72 therein preventing the ball from slipping off the steering line.

Maneuvering can be performed as follows: Assuming that a parachute is falling and fully blossomed, a pull may be applied to the ball 68 to the end of steering line 62 attached to the point 6, which pull is transmitted to the skirt at the seam between the end of the laterally extending slot 50 and the adjacent unslotted gore 38, producing the distortion shown in FIGS. 2 and 6. In this condition, the left hand end of the slot 50 is extended downwardly, thereby distorting a triangular area of the gore above the slot 50, defined by the points a, b and c in FIG. 4, to an angular or vane position, which area will curl upwardly and outwardly. This effect inherently enlarges the area of the slot 46 (FIG. 2), creating a spilling factor which tends to rotate the parachute in a counterclockwise direction as viewed from above, or to the parachutist's left. Both of the above results occur simultaneously, causing a very fast and stable canopy rotation. It should be noted, in this connection, that the slots 50 and 46, as well as the other slots 48, 54 and 52, have no mesh therein, as is usual in prior art parachutes, and consequently the shape and cross sectional area of the slots can be varied to egect steering. The canopy rotation is further accelerated by a deflection surface, between points 6 and 7 adjacent to slot 50, brought into play simultaneously with the spilling effect by the downward pull on the line connected with point 6, braking the respective side in relation to the direction of rotation.

It is evident that a combined spilling and deflection principle will result in a sensitive, accelerated, and short turn radius as compared to the present prototypes of steerable parachutes.

A similar distorting and an opposite rotation occur when the ball 68 on the end of the steering line 62 attached to the suspension line connected to point 23 is pulled (FIG. 3). Under such a distortion, the air spilling from the gore 38 between the points 23 and 24 through the slots 52 and 48 will produce an impulse tending to rotate the canopy in a clockwise direction as viewed from above, or toward the parachutist's right. As explained above, the air spilling from the undistorted slots 46, 48, 50, 52 and 54 produces an impulse moving the canopy forwardly. This forward movement can be controlled by simultaneously pulling both steering lines to distort the canopy as shown in FIGS. 2 and 3. When both steering lines are pulled down simultaneously, a deflection is created in the two rear quarter sections of the canopy which acts as equal braking surfaces. The spilling of air from the slots produces a reverse effect in the directional glide of the parachute canopy. By varying the amount of pull, the forward translational speed or movement can be nullified, and by pulling on the steering lines a greater amount, a reverse translational speed or movement can be effected.

It is apparent, from the foregoing, that a fairly inexperienced parachutist is able, by suitably and selectively pulling on one or both of the steering lines 62, to orient the position of the parachute during the fall, and also control the direction of fall with the wind, against the wind, or transverse to the direction of the wind. The omission of the mesh within the slots allows a greater degree of flexibility and compensation than canopies with slots having mesh therein. The omission of the mesh also permits a steerable parachute canopy to "breathe" in turbulent currents and induces a higher degree of stability resulting in a decreased oscillation ratio.

Since certain changes may be made in the above described structure, and different embodiments of the invention are obvious without departing from the spirit thereof, it is intended that all of the matter contained in the above description or shown in the accompanying drawings shall be considered as illustrative and not in a limiting sense.

We claim:

1. A steerable parachute, comprising: a canopy having a series of gores; a steering arrangement including an elongated slot in one gore extending over a major portion of its length beginning at a point adjacent the outer periphery of the canopy, the gore at one side of said slotted gore having a single lateral slot of relatively small radial extent adjacent the outer periphery of the canopy, an unslotted gore adjoining said laterally slotted gore, a suspension line extending from a point between each pair of adjoining gores; a riser; a connector link connected with said riser and attached to said suspension lines; and a steering line attached at one end thereof to the suspension line extending from the point between the gore having the slot of relatively small radial extent and the unslotted adjoining gore, said steering line being attached to said suspension line at a point between the connector link and the canopy, whereby a pull on said steering line produces a local deflection of the canopy and a spilling effect resulting in rotation of the canopy.

2. A steerable canopy as defined in claim 1, including at least one lateral slot of relatively small radial extent on the other side of said gore having the elongated slot.

3. A steerable canopy as defined in claim 1, wherein the other end of the steering line has attached thereto manually graspable member within reach of a parachutist suspended by the parachute.

4. A steerable parachute comprising: a canopy having a plurality of radially extending gores, a pair of spaced gores including elongated slots beginning adjacent the periphery of the canopy and extending radially inwardly over a major portion of the radial length of said pair of gores; and a pair of laterally extending slots, one laterally extending slot being located in a gore adjacent one of said pair of spaced slotted gores, and another laterally extending slot being located in a gore adjacent the other of said pair of spaced slotted gores, said laterally extending slots being adjacent the periphery of the canopy and having a relatively small radial extent; an unslotted gore adjoining each of said laterally slotted gores and a plurality of suspension lines, each suspension line extending from a point between each pair of adjoining gores, two separate steering lines, one of said steering lines being connected at one end thereof to a suspension line extending from the point between one of the unslotted gores and its adjoining laterally slotted gore, and the other of said steering lines being connected at one end thereof to a suspension line extending from the point between another unslotted gore and its adjoining laterally slotted gore, whereby a selective pull on said one steering line produces a local deflection of the canopy and a spilling effect resulting in rotation of the canopy in one direction, and a pull on said other steering line produces a local deflection of the canopy and a spilling effect resulting in rotation of the canopy in the other direction.

5. A steerable parachute as defined in claim 4, in which the laterally extending slots extend in opposite directions from the elongated slots.

6. A steerable parachute as defined in claim 4, including a harness, the harness having a plurality of risers, connector links attached to said risers, said suspension lines being connected to said connector links, and wherein each steering line is attached to its associated suspension line at a point between the connector link and the canopy.

7. A steerable parachute as defined in claim 6, wherein the other end of each of said steering lines has attached thereto a manually graspable member within reach of a parachutist suspended by the parachute.

8. A steerable parachute as defined in claim 7, wherein each of said risers includes a retaining loop to retain the steering line in position.

9. A steerable parachute as defined in claim 4, in which the canopy includes four quarter sections, and wherein one of said longitudinally extending slotted gores and the adjoining laterally extending slotted gore are located in one quarter section of the canopy, and in which the other of said longitudinally extending slotted gores and the adjoining laterally extending slotted gore are located in an adjacent section of the canopy.

10. A steerable parachute as defined in claim 4, in which the canopy includes four quarter sections, and in which the laterally extending slots extend in opposite directions from the elongated slots and away from one another, one of said longitudinally extending slotted gores and the adjoining laterally extending slotted gore being located in one quarter section of the canopy, and the other of said longitudinally extending slotted gores and the adjoining laterally extending slotted gore being located in an adjacent quarter section of the canopy.

11. A controllable parachute, comprising: a canopy having a series of radially extending gores; a harness; and a series of suspension lines extending between adjoining gores and attached to the canopy and harness; and means in said canopy for controlling the rotational and linear motion of said parachute comprising an elongated, radially extending, slot in each of a pair of circumferentially spaced gores, said slots extending over a major portion of the radial extent of the gores, and a circumferentially extending slotted area adjacent the periphery of the canopy, said circumferentially extending slotted area having a relatively small radial extent and spanning the gores between said spaced slotted gores and also extending in opposite directions and equal distances past said spaced slotted gores, the remaining gores being unslotted, whereby a selective pull on a first suspension line attached to a point at one end of the circumferentially slotted area produces a local deflection of the canopy and a spilling effect resulting in rotation of the canopy in one direction, and a pull on a second suspension line attached to a point at the other end of the circumferentially slotted area produces a local deflection of the canopy and a spilling effect resulting in rotation of the canopy in the other direction, and whereby a pull on both of said first and second suspension lines produces local deflection at the points of attachment and a spilling effect resulting in a variation of the forward or rearward propulsion, a first steering line connected to said first suspension line, and a second steering line connected to said second suspension line, said steering lines being within reach of and operable by a parachutist suspended by the parachute.

12. A controllable parachute as defined in claim 11, in which the canopy has four quarter sections and wherein said radially extending slots and said circumferentially extending slotted area are located within adjacent quarter sections.

13. A controllable parachute as defined in claim 12, in which said harness includes risers having connecting links, the connecting links being attached to one end of the suspension lines from the quarter sections of the canopy, and wherein the steering lines are connected at one end thereof to the first and second ssupension lines at a point between the connecting links and the canopy.

14. A controllable parachute as defined in claim 13, in which the other ends of said steering lines carry means within reach of and adapted to be manually grasped by a parachutist suspended by said parachute.

References Cited in the file of this patent

UNITED STATES PATENTS

| | | |
|---|---|---|
| 2,384,416 | Derry | Sept. 4, 1945 |
| 2,458,264 | Hart | Jan. 4, 1947 |
| 2,469,573 | Quilter | May 10, 1949 |
| 2,746,699 | Hart | May 22, 1956 |